May 12, 1959
A. J. PRATT
2,886,279
STYLUS CONTROL MOTOR
Filed May 12, 1958
2 Sheets-Sheet 1
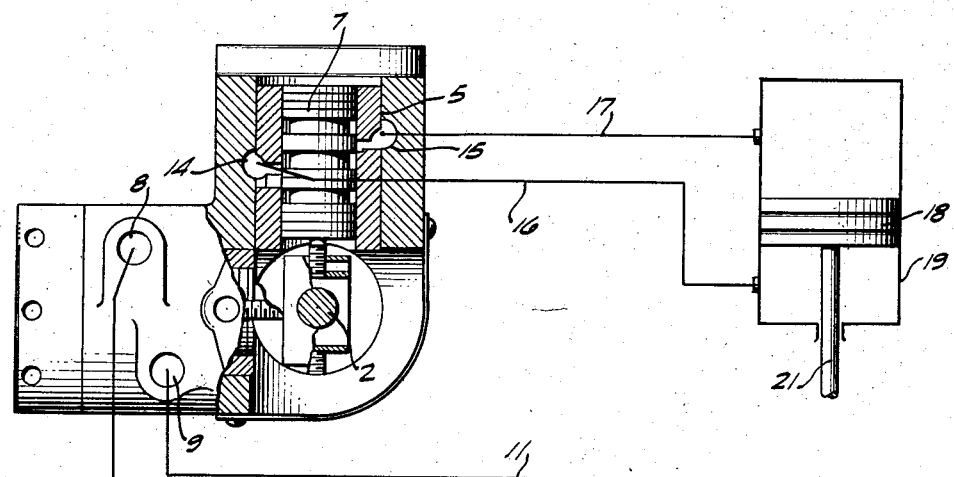
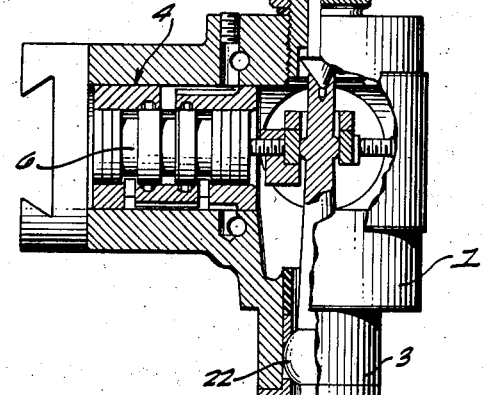
INVENTOR.
ARTHUR J. PRATT,
BY
ATTORNEY.

May 12, 1959  A. J. PRATT  2,886,279
STYLUS CONTROL MOTOR
Filed May 12, 1958  2 Sheets-Sheet 2
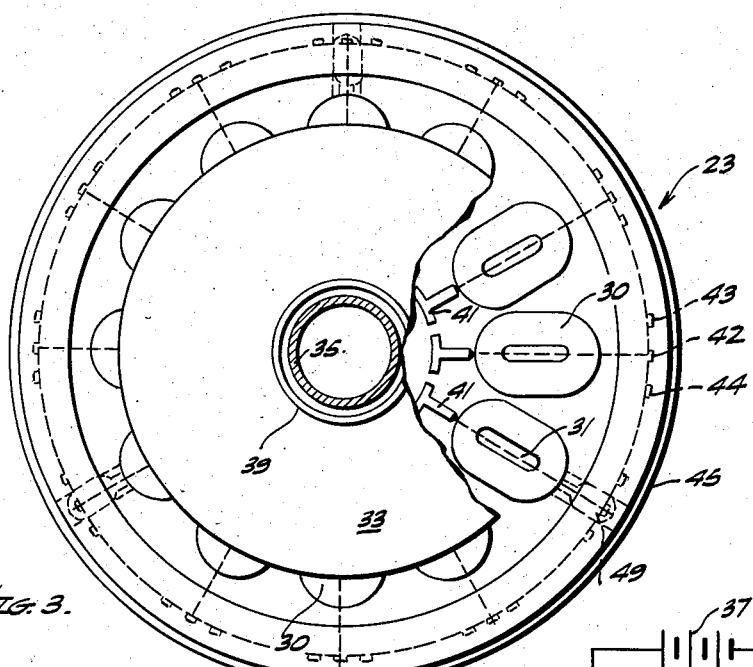
FIG. 3.
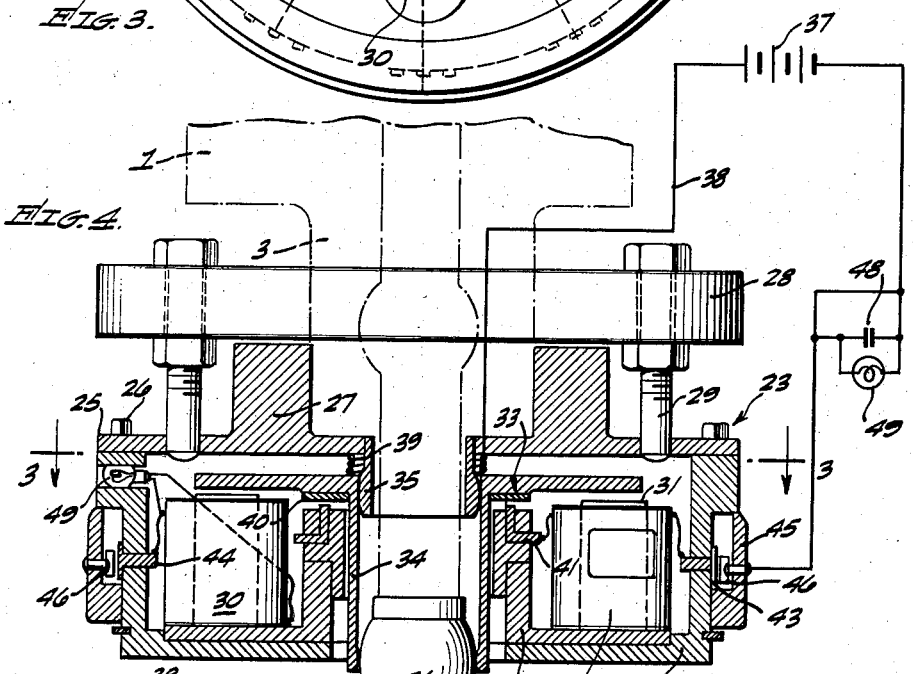
FIG. 4.
FIG. 5.
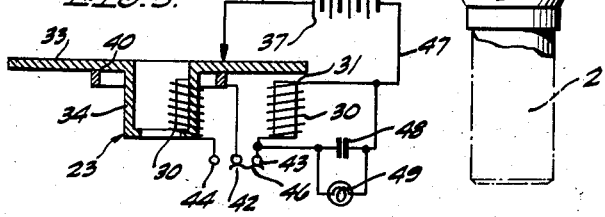
INVENTOR.
ARTHUR J. PRATT,
BY
ATTORNEY.

United States Patent Office 2,886,279
Patented May 12, 1959

2,886,279

STYLUS CONTROL MOTOR

Arthur J. Pratt, Long Beach, Calif.

Application May 12, 1958, Serial No. 734,603

8 Claims. (Cl. 251—3)

This invention relates to automatic pattern controlled machine tools, and particularly tools which include a hydraulic tracing valve and one object of my invention is the provision of a simple, reliable and improved control for the stylus of a hydraulic tracing valve, and also to more effectively cause the stylus to follow the contours of a pattern, model, drawing, or the like.

More specifically, my invention relates to automatic pattern or model controlled machine tools, such as milling machines, routers, lathes, and the like, upon which a hydraulic type of tracing valve may be used. The relative movement of the cutter and the work piece in machine tools of this character is controlled by means of a hydraulic tracing valve which is maintained in engagement with the pattern or model as it is moved along the profile thereof, and the pressure of the machine tool against the tracer valve is considerable to thus maintain a constant force upon the stylus to press the stylus against the profile of the pattern or model.

In machine tools, such as milling machines, routers, etc., contemplated in this invention, means are provided for supporting the pattern or model and the work piece in operative relationship with the tracing valve and the cutter respectively. Suitable driving means controlled by the tracing valve (such as hydraulic pistons) are provided for effecting the relative movement of the cutter and the work piece. This relative movement of the cutter and the work piece is the resultant of two angularly displaced components usually at right angles, thus providing a longitudinal movement and a transverse movement, and sometimes a third dimensional movement is also imparted.

An object of my invention is to provide an electrical means upon a hydraulic tracing valve of a type usual and well known in the art, such as Model A-360-1, made by True-Trace Company of El Monte, California, or other machines of a comparable hydraulic type wherein a stylus is provided for engagement with the pattern or contour of a model; my invention causes this stylus to be pressed constantly against the profile of the pattern or model, this pressure being accomplished by means of electromagnets, the magnets being arranged through a horizontal angle of 360°.

Another object of my invention is to provide a novel stylus control motor of the electromagnet type wherein the various electromagnets are energized as the angle of the stylus varies while following the contour or profile of a pattern or model.

Still another object is to provide a novel stylus control motor of the character stated, in which the stylus can be urged either in a right-hand relative movement or a left-hand relative movement by a manually positioned switch ring on said motor. The movement of the lower part of the stylus about a vertical axis is substantially circular.

Still another feature of my invention is that the stylus control motor can be easily mounted on any of the usual and well known types of hydraulic tracing valves commonly used in the industry.

Other objects, advantages and features of invention may appear from the accompanying drawing, the subjoined detailed description and the appended claims.

In the drawing:

Figure 1 is a vertical view of a hydraulic tracing valve with parts broken away to show interior construction.

Figure 2 is a diagrammatic plan view of a hydraulic tracing valve of the type shown in Fig. 1 with parts broken away to show interior construction.

Figure 3 is a top plan view of my stylus control motor with the cover plate removed taken on line 3—3 of Fig. 4.

Figure 4 is a vertical sectional view of my stylus control motor.

Figure 5 is a wiring diagram illustrating the means to energize the electromagnets.

Referring more particularly to the drawing, the numeral 1 indicates the body of a hydraulic tracing valve, and particularly Model A-360-1 of the True-Trace Company, of El Monte, California, said tracing valve including a stylus 2 which extends vertically into the body 1 and projects below a ring portion 3 of the body. The body 1 of the tracing valve is suitably mounted on the work arm of the machine (not shown) and the body is provided with two cylinders 4 and 5 in which spool valves 6 and 7, respectively, are mounted. The spool valves 6 and 7 are arranged in the same horizontal plane but at right-angles to each other, and there may also be a third spool valve if control of the machine tool in a third plane is desired. The stylus 2 engages both of the spool valves 6 and 7 causing these spool valves to move longitudinally in the cylinders 4—5, respectively, depending upon the position of the stylus 2 in the body 1 while following the contour or profile of the pattern or model. The spool valve 6 controls fluid pressure to the outlet ports 8 and 9, which ports in turn are connected through suitable tubing 10—11 to a hydraulic cylinder 12 and to either side of the piston 13 in said cylinder. Similarly, the spool valve 7 controls the two outlet pressure ports 14—15, which ports are connected through tubing 16—17 to either side of the piston 18 in the cylinder 19. The cylinders 12 and 19 are arranged at right-angles to each other and through their piston rods 20 and 21 control the movement of the work piece of the machine tool which is being controlled by the tracing valve. While considerable pressure is exerted by the work arm of the machine tool to hold the stylus 2 against the profile of the pattern or model, still it is necessary to cause the stylus 2 to accurately follow the contours of the pattern or model, and for this purpose I have provided my stylus control motor which will hold the stylus against the pattern or model at all times, and will change the angle of pressure against the stylus in accordance with the angle of the pattern contour which is being followed. The stylus 2 is provided with a ball pivot 22 so that the stylus can move through a horizontal angle of 360° while controlling the spool valves 6 and 7.

My stylus control motor 23 consists of a ring-shaped housing 24 enclosed by a plate 25, removably secured at the top thereof by means of suitable bolts or cap screws 26. A neck 27, at the center of the cover 25, will fit the ring portion 3 of the body 1 of the tracing valve. It is advisable to level the body 24 of the control motor relative to the vertical center line of the tracing valve 1. To accomplish this a leveling plate 28 is fixedly attached to the reduced portion 3 of the body 1, and leveling screws 29 extend through the plate 28 and into the cover plate 25, thus enabling the body 24 of the control motor to be accurately leveled relative to the body 1 of the tracing valve.

A plurality of electromagnets 30 are fixedly mounted in the housing 24 and are circumferentially spaced. These electromagnets each include a metal core 31 for the purpose of attracting an adjacent metal part, as will be subsequently described. The electromagnets 30 are each fixedly attached to a ring 32 which is mounted in the housing 24. A wabble plate 33 is mounted within the housing 24 and the plate is closely positioned above the magnets 30. The cores 31 and the magnets 30 when energized will serve to pull the plate 33 downwardly and hold it in this depressed or angular position as long as the particular magnet is energized. A sleeve 34 depends from the plate 33 and surrounds the stylus 2. A bearing ring 35 extends downwardly from the cover 25 and engages the sleeve 34 adjacent its upper end for the purpose of centering and guiding the sleeve 34 as well as the plate 33. A pivot bearing 36 on the stylus 2 is engaged by the lower end of the sleeve 34 so that when the stylus 2 is moved angularly within the body 1 of the tracing valve this movement will be imparted to the wabble plate 33, causing this plate to be tilted in accordance with the direction of movement of the stylus 2. The movement of the stylus 2 is determined by the pattern, profile or contour of the model, and the position of the stylus 2 is maintained within the body 1 of the tracing valve by the wabble plate 33 which is held in its position by means of one of the energized electromagnets 30, as will be subsequently described.

The electromagnets 30 are selectively energized by a battery 37, one pole of which is connected to the wabble plate 33 through the lead 38. A spring 39 bears against the top of the wabble plate 33 to urge the plate downwardly, and to also act as a conductor for electrical current from the lead 38 and thence to the plate 33. A contact ring 40 is provided on the bottom of the plate 33 and this ring will selectively engage one of the contacts 41 which are positioned opposite each of the magnets 30. The contacts 41 are each connected to a switch contact 42 which is positioned on the periphery of the housing 24. On each side of the switch contact 42 there are provided contacts 43 and 44; the contact 43 being electrically connected to an electromagnet on one side of the magnet in line with the contact 41 and the contact 44 is electrically connected to the electromagnet on the other side of the magnet in line with the contact 41. In other words, the contacts 42, 43 and 44 are arranged in groups of three, and similarly, the electromagnets are arranged in groups of three as far as the contacts are concerned. Thus the central of a group of three would be positioned opposite the contact 41 which is being engaged by the ring 40 of the plate 33. The electromagnets on each side of the central magnet are each connected to one of the contacts 43 and 44 substantially as shown. A contact ring 45 is rotatably mounted on the housing 24 and this contact ring is provided with spaced contacts 46 which engage either the contacts 42—43 or the contacts 42—44. The pairs of contacts which are thus coupled by the switch member 46 determines whether a right-hand or left-hand rotative movement in a circle and around a vertical axis is desired. If a right-hand rotative movement is desired the contacts 42—43 are coupled, while if a left-hand rotative movement is desired the contacts 42—44 are coupled. Once the direction of rotation or rotary movement of the stylus 2 is determined the contact ring 45 is not moved. The stylus 2 will have a rotative movement in a circle imparted thereto by the successive energization of the electromagnets 30. One initial adjustment is all that is necessary.

As thus far described it will be evident that when the stylus 2 is tilted this movement in turn will tilt the plate 33, causing the contact ring 40 to engage one of the commutator segments 41, and when this occurs current is then conducted from the contact 42 to contact 43 (or 44); thus conducting current to the windings 30 of an adjacent electromagnet which energizes its core 31 and pulls the plate 33 downwardly to hold the stylus 2 in its tilted position. The circuit to the windings 30 of any of the electromagnets is completed through a lead 47 to the battery 37. A condenser 48 in the circuit reduces the possible electrical arc while contacts are being made or broken in the control motor and during the operation of the same. To insure that the wabble plate 33 is in a horizontal position and is not engaging any of the magnets 30 when the control motor is first set up, I provide a plurality of signal lights 49 which are positioned at intervals around the periphery of the housing 24, and if all of these lights are lit the plate 33 will be equally spaced from the electromagnets 30 and will be ready to start functioning when the stylus 2 engages the appropriate pattern.

*In operation.*—The leveling plate 28 is first attached to the hub portion 3 of the body 1, and thereafter the housing 24 of the stylus control motor is threaded over the stylus 2 and is properly leveled with relation to the body 1 by means of the leveling screws 29. The battery 37 is connected to the wabble plate 33 through the lead 38, and the other side of the battery is connected to the spaced contacts 46 on the contact ring 45, and the contacts 46 are adjusted to engage either the contacts 42—43 or the contacts 42—44 as desired. The housing 24 is leveled so that the wabble plate 33 is equally spaced above the armature 31 of the electromagnets 30. When this occurs the lights 49 are all simultaneously lit. The hydraulic tracing valve and the stylus 2 thereof are moved until the stylus engages the edge or contour of the pattern or model. The weight of the machine and the tracing valve is such that the stylus 2 will tilt when it engages an edge or surface of the pattern or model. The tilting of the stylus 2 will cause a simultaneous tilting of the sleeve 34 which, in turn, tilts the wabble plate 33 until the contact ring 40 engages one of the commutator contacts 41. When this occurs the electrical current flows to the contact 42 and thence through the spaced contact fingers 46 to the windings of an electromagnet 30, which electromagnet is positioned either to the right or the left of the particular commutator contact 41 which is being engaged at the particular moment. The armature 31 of the energized electromagnet attracts and holds the wabble plate 33 so that the stylus 2 is thus held by magnetic attraction, and will maintain its tilted position originally imparted to it until a change in surface direction is required by the pattern or model. When a different angle is required by the model or pattern the stylus will change its particular tilt and will simultaneously pull the wabble plate 33 off of its first contacted armature as stated above, and will thereafter cause the ring 40 to engage another commutator contact 41, after which another electromagnet is energized in the same manner as specified above. Thus it will be evident that the stylus 2 will be held in its particular tilted or angular position by magnetic attraction on the wabble plate 33, and also that the wabble plate is so positioned that it will energize the proper electromagnet by the particular tilted angle of the stylus 2. The fact that an electromagnet either to the left or the right is the one which is energized to hold the wabble plate 33, rather than the electromagnet which is directly in line with the particular angle of the stylus 2 is that a short interval of time is required for the tracing valve to move before the stylus 2 actually starts moving along a different angle on the pattern or model than the one which it was previously transversing. This interval of movement of the tracing valve and the control motor permits the stylus to impart a motion to the wabble plate 33 and thus cause the electrical contacts to engage and the electromagnets to be energized as stated above.

Having described my invention, I claim:

1. In a hydraulic tracing valve including a body, hydraulic valves in the body and a stylus extending into the body and engageable with the hydraulic valves to actuate the same, of a stylus control motor comprising a housing surrounding the stylus, means securing said housing to said body, a wabble plate in said housing, means mounting the wabble plate for movement in a vertical plane, means on the wabble plate engageable by the stylus to transmit movement of the stylus to the wabble plate, a plurality of electromagnets in said housing and adjacent the wabble plate, contact means engageable by the wabble plate to selectively energize said electromagnets to attract and hold the wabble plate and stylus in a tilted position.

2. The structure as recited in claim 1 and the means securing said housing to said body comprising a leveling plate on said body, and leveling screws extending from the leveling plate to said housing.

3. In a hydraulic tracing valve including a body, hydraulic valves in the body and a stylus extending into the body and engageable with the hydraulic valves to actuate the same, of a stylus control motor comprising a housing surrounding the stylus, means securing said housing to said body, a wabble plate in said housing, means mounting the wabble plate for movement in a vertical plane, means on the wabble plate engageable by the stylus to transmit movement of the stylus to the wabble plate, a plurality of electromagnets in said housing and adjacent the wabble plate, a segmental commutator in said housing, a contact means on the wabble plate engaging the commutator segments to selectively energize said electromagnets to attract and hold the wabble plate and stylus in a tilted position.

4. The structure as recited in claim 3 and in which the means securing said housing to said body comprises a leveling plate on the body, and leveling screws extending from the leveling plate to said housing.

5. In a hydraulic tracing valve including a body, hydraulic valves in the body and a stylus extending into the body and engageable with the hydraulic valves to actuate the same, of a stylus control motor comprising a housing surrounding the stylus, means securing said housing to said body, a ring-shaped wabble plate in said housing and surrounding the stylus, a sleeve depending from the wabble plate and surrounding the stylus, said stylus engaging the sleeve to transmit movement of the stylus to the wabble plate in a vertical plane, a plurality of circumferentially spaced electromagnets in said housing and adjacent the wabble plate, contact means electrically connected to the electromagnets, said contact means being engageable by the wabble plate to selectively energize said electromagnets to attract and hold the wabble plate and stylus in a tilted position.

6. The structure as set forth in claim 5 and in which the means securing said housing to said body consists of a leveling plate on the body, and leveling screws extending from said leveling plate to said housing.

7. In a hydraulic tracing valve including a body, hydraulic valves in the body and a stylus extending into the body and engageable with the hydraulic valves to actuate the same, of a stylus control motor comprising a housing surrounding the stylus, means securing said housing to said body, a wabble plate in said housing, means mounting the wabble plate for movement in a vertical plane, means on the wabble plate engageable by the stylus to transmit movement of the stylus to the wabble plate, a plurality of electromagnets in said housing and adjacent the wabble plate, contact means engageable by the wabble plate to selectively energize said electromagnets to attract and hold the wabble plate and stylus in a tilted position, a contact ring rotatably mounted on said housing, spaced contacts in the housing electrically connected to adjacent electromagnets, said contact ring selectively engaging the spaced contacts to energize the electromagnets.

8. The structure as set forth in claim 7 and in which the means securing said housing to said body comprises a leveling plate on the body, and leveling screws extending from said leveling plate to said housing.

References Cited in the file of this patent

UNITED STATES PATENTS

| 1,996,438 | Shaw | Apr. 2, 1935 |
| 2,841,356 | Glaser | July 1, 1958 |
| 2,845,942 | Moore | Aug. 5, 1958 |